US008841793B2

(12) United States Patent
Wang

(10) Patent No.: US 8,841,793 B2
(45) Date of Patent: Sep. 23, 2014

(54) HYDROELECTRIC DEVICE

(71) Applicant: Ben Wang, Pingtung County (TW)

(72) Inventor: Ben Wang, Pingtung County (TW)

( * ) Notice: Subject to any disclaimer, the term of this patent is extended or adjusted under 35 U.S.C. 154(b) by 0 days.

(21) Appl. No.: 13/905,081

(22) Filed: May 29, 2013

(65) Prior Publication Data

US 2013/0320680 A1     Dec. 5, 2013

(30) Foreign Application Priority Data

Jun. 5, 2012 (TW) .............................. 101210793 A

(51) Int. Cl.
*F03B 13/00* (2006.01)

(52) U.S. Cl.
USPC ............................................. 290/54; 290/43

(58) Field of Classification Search
USPC ........................................ 290/43, 54; 415/3.1
See application file for complete search history.

(56) References Cited

U.S. PATENT DOCUMENTS

| | | | | |
|---|---|---|---|---|
| 2,097,286 A * | 10/1937 | McGee | ............................ | 290/54 |
| 4,023,041 A * | 5/1977 | Chappell | .......................... | 290/53 |
| 4,383,797 A * | 5/1983 | Lee | .................................... | 415/7 |
| 5,789,826 A * | 8/1998 | Kumbatovic | .................... | 290/53 |
| 6,133,644 A * | 10/2000 | Smith et al. | ..................... | 290/53 |
| 6,551,053 B1 * | 4/2003 | Schuetz | .......................... | 415/3.1 |
| 6,616,403 B1 * | 9/2003 | Smith et al. | .................... | 415/3.1 |
| 7,042,113 B2 * | 5/2006 | Aukon | ............................. | 290/54 |
| 7,223,137 B1 * | 5/2007 | Sosnowski | ........................ | 440/3 |
| 7,429,803 B2 * | 9/2008 | Davis | ............................... | 290/54 |
| 7,462,949 B2 * | 12/2008 | Coman | ............................ | 290/54 |
| 7,696,633 B2 * | 4/2010 | Zajchowski et al. | ............ | 290/54 |
| 8,382,425 B2 * | 2/2013 | Griffin | .......................... | 415/126 |

\* cited by examiner

*Primary Examiner* — Nicholas Ponomarenko
(74) *Attorney, Agent, or Firm* — Leong C. Lei

(57) ABSTRACT

The hydroelectric device contains two base members, a hoist member, a paddle wheel member, and a power generation member. The base members are for the installation of the other members. The host member contains a pair of arm elements rotatably connected to the base members. The paddle wheel member contains an axle whose two ends are pin-joined to the arm elements, respectively. Therefore, the axle is rotatably configured across the arm elements, and across the base members. An end of the axle is configured with a first transmission element. The power generation member has a second transmission element at its input end engaged by the first transmission element. When the axle is turned and the first transmission element spins synchronously, the second transmission element of the power generation member is engaged to spin synchronously and the power generation member is driven to produce electricity.

2 Claims, 6 Drawing Sheets

HYDROELECTRIC DEVICE

TECHNICAL FIELD OF THE INVENTION

The present invention is generally related to hydroelectric devices, and more particular to a hydroelectric device of enhanced efficiency and convenient maintenance

DESCRIPTION OF THE PRIOR ART

The present applicant's home country, Taiwan, is mountainous with abundant precipitation, and the numerous rivers and brooks are natural resources for power generation. Building dams is one way to harness the rivers' potential energy. Setting up a paddle wheel in the river so that the paddle wheel is turned by the water stream is one of the other ways.

For a conventional paddle wheel such as the one taught by R.O.C. Taiwan Patent M421984, an axle is rotatably mounted on a base and a number of paddles are configured peripherally around the axle. Usually a conventional paddle wheel is fixedly configured in the river. If there are rocks are the river bed, the paddle wheel would be blocked or even damaged. For repairmen or maintenance, the entire paddle wheel has to be moved out of the river, which is rather inconvenient.

SUMMARY OF THE INVENTION

To overcome the shortcomings of the foregoing conventional devices, the present invention provides a hydroelectric device of enhanced efficiency and convenient maintenance.

The hydroelectric device contains two base members, a hoist member, a paddle wheel member, and a power generation member.

The base members are for the installation of the hoist member, the paddle wheel member, and the power generation member. An accommodation space is formed between the base members. Two pivotal elements are configured on the base members, respectively.

The host member contains a pair of arm elements, each having a first end joined to one of the pivotal elements with a shaft As such, the two arm elements are connected to the base members, and are able to swivel with the shafts as pivots. A connection rod is configured between and perpendicularly connected to the arm elements so that they swivel synchronously.

The paddle wheel member contains an axle whose two ends are pin-joined to the arm elements' second ends, respectively. Therefore, the axle is rotatably configured across the arm elements, and across the base members. A number of paddles are radially configured around the axle, and each paddle can be submerged at least partially into a water stream. As such, the flowing water pushes the paddles to turn the axle. Each paddle has its outer end configured into a roughly V-shaped bended section. An end of the axle is configured with a first transmission element. The first transmission element spins synchronously along with the axle.

The power generation member has a second transmission element at its input end engaged by the first transmission element of the axle. When the axle is turned and the first transmission element spins synchronously, the second transmission element of the power generation member is engaged to spin synchronously and the power generation member is driven to produce electricity.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
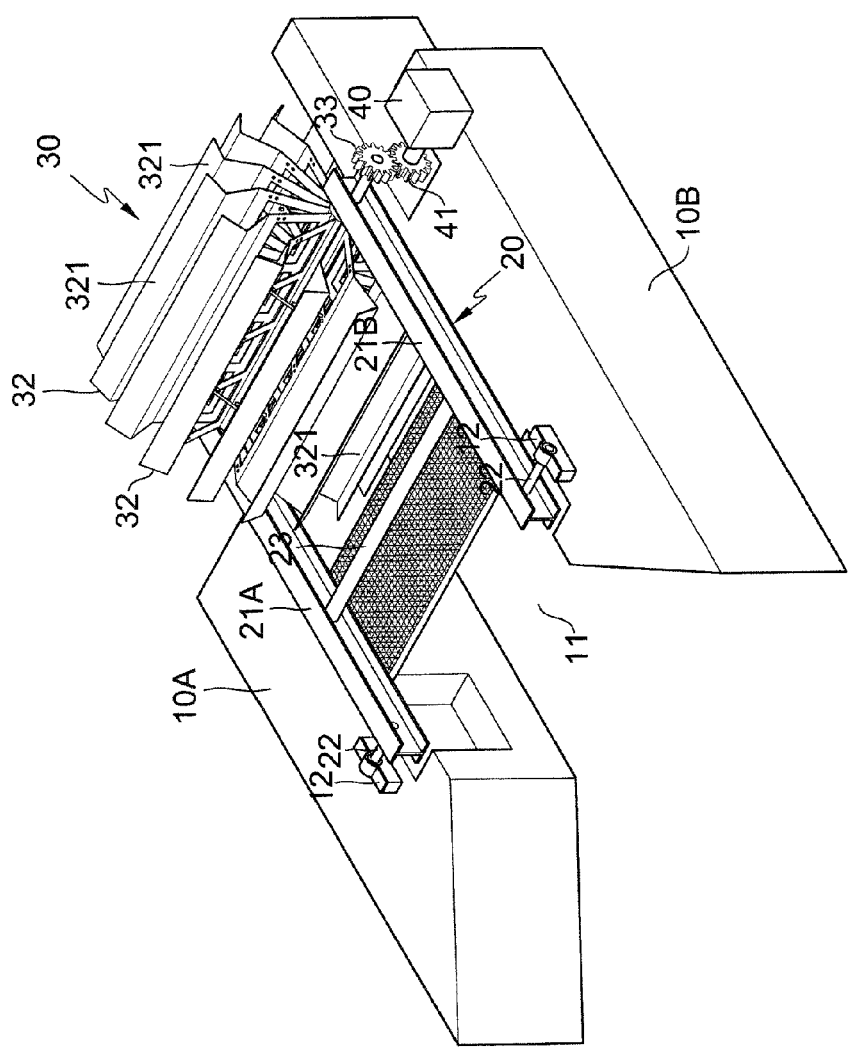
FIG. 1 is a perspective diagram showing a hydroelectric device according to an embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims As illustrated in FIG. 1, a hydroelectric device according to an embodiment of the present invention contains two base members 10A and 10B, a hoist member 20, a paddle wheel member 30, and a power generation member 40.

Figure 2:
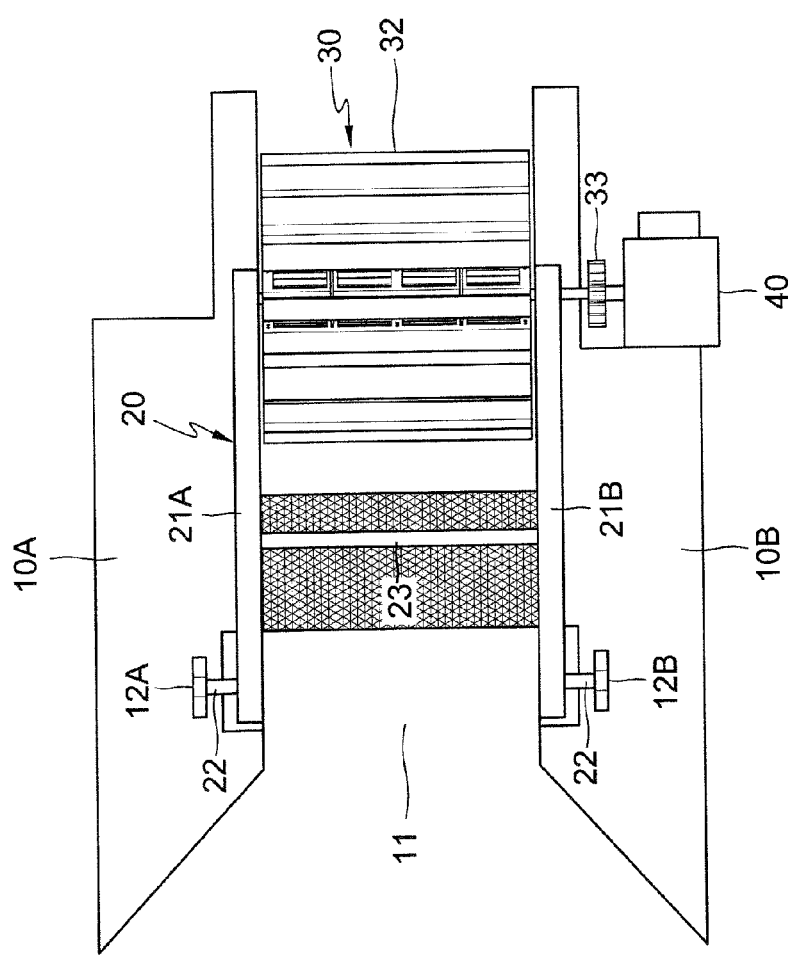
FIG. 2 is a top-view diagram showing the hydroelectric device of FIG. 1.
Figure 3A:
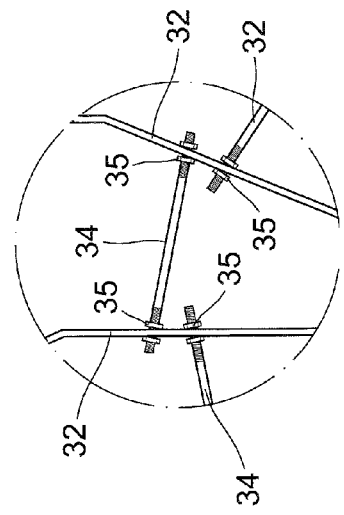
FIG. 3A is an enlarged view of a portion of FIG. 3.
Figure 3:
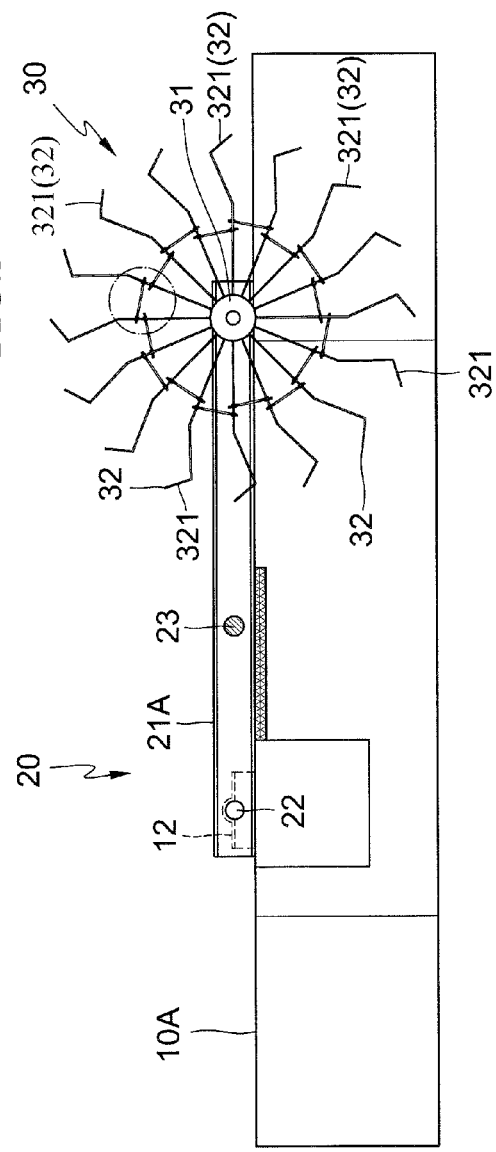
FIG. 3 is a side-view diagram showing the hydroelectric device of FIG. 1.

As also illustrated in FIGS. 2 and 3, the base members 10A and 10B are for the installation of the hoist member 20, the paddle wheel member 30, and the power generation member 40. The base members 10A and 10B are configured in a river, brook, or ditch, or on the banks to the river, brook, or ditch, respectively, between which an accommodation space 11 is formed. Two pivotal elements 12A and 12B are configured on the base members 10A and 10B, respectively.

The host member 20 contains a pair of arm elements 21A and 21B, each having a first end joined to one of the pivotal elements 12A and 12B with a shaft 22. As such, the two arm elements 21A and 21B are connected to the base members 10A and 10B, and are able to swivel with the shafts 22 as pivots. A connection rod 23 is configured between and perpendicularly connected to the arm elements 21A and 21B so that they swivel synchronously.

The paddle wheel member 30 contains an axle 31 whose two ends are pin-joined to the arm elements' second ends, respectively. Therefore, the axle 31 is rotatably configured across the arm elements 21A and 21B, and across the base members 10A and 10B. A number of paddles 32 are radially configured around the axle 31, and each paddle 32 can be submerged at least partially into the water in the river, brook, or ditch. As such, the flowing water pushes the paddles 32 to turn the axle 31. Each paddle 32 has its outer end configured into a roughly V-shaped bended section 321. An end of the axle 31 is configured with a first transmission element 33 such as a gear. The first transmission element 33 spins synchronously along with the axle 31.

As illustrated in FIGS. 3 and 3A, a spacing beam 34 is configured between every pair of neighboring paddles 32. Each spacing beam 34 has adjustment elements 35 at both ends by which the distance between the two neighboring paddles 32 can be adjusted. All paddles 32 are as such configured around the axle 31 with equal spacing, and the paddle wheel member 30 is turned smoothly by the water stream.

The power generation member 40 has a second transmission element 41 such as a gear at its input end engaged by the first transmission element 33 of the axle 31. When the axle 31 is turned and the first transmission element 33 spins synchronously, the second transmission element 41 of the power generation member 40 is engaged to spin synchronously and the power generation member 40 is driven to produce electricity.

Please note that, for clarity's sake, FIGS. 3 to 6 provide profile views only to the base member 10A and the paddle wheel member 30, and omit the other base member 10B and the power generation member 40.

Figure 4:
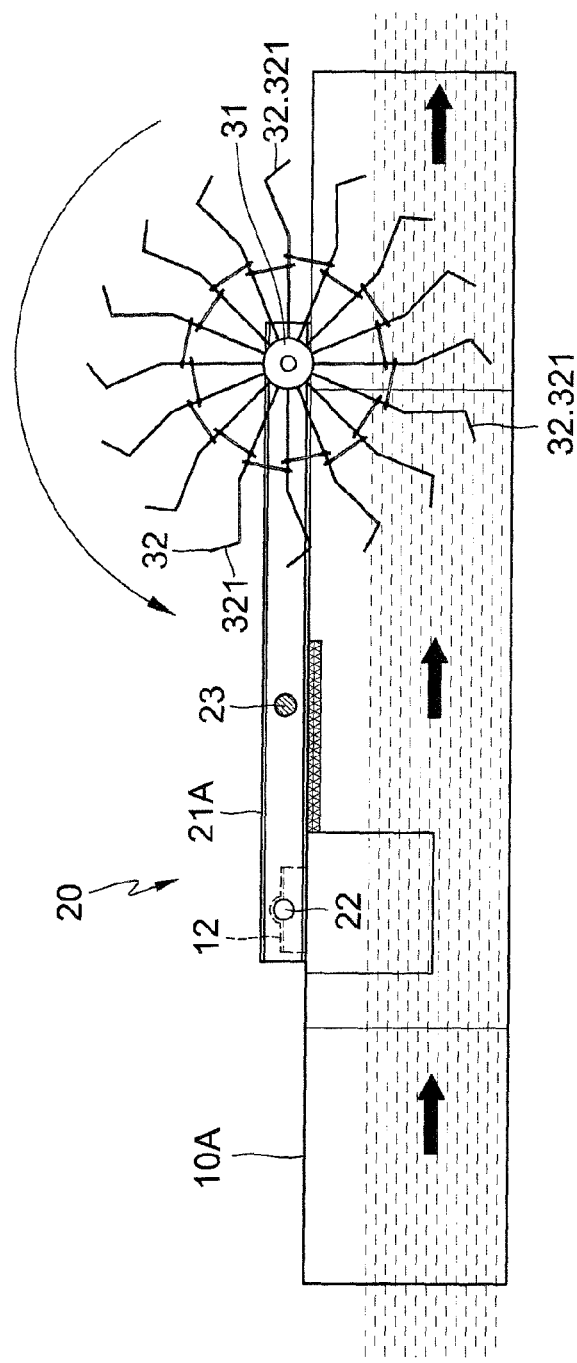
FIG. 4 is a schematic diagram showing the paddles of the hydroelectric device driven by the water stream to spin.

As shown in FIG. 4, the base members 10A and 10B are configured on the banks to the river, brook, or ditch, respectively, so that the paddles 32 can be engaged by the water stream. As the axle 31 spins along with the paddles 32 pushed by the water stream, the power generation member 40 is driven to produce electricity through the first and second transmission elements 33 and 41. The bended sections 321 at the outer ends of the paddles 32 provide increased surface areas for engagement by the water stream, thereby increasing the duration and distance of the water steam's influence on the paddles 32, and as such the smoothness of the axle 31's spin and the efficiency of the power generation member 40.

Figure 5:
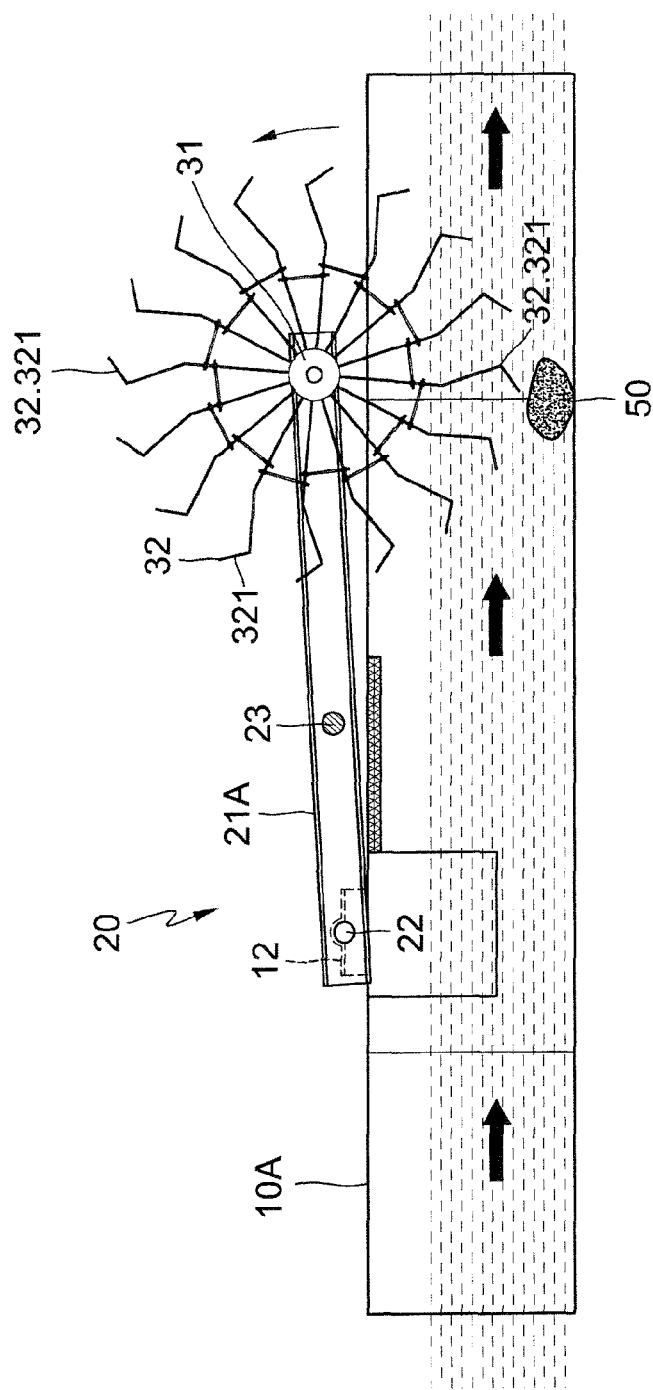
FIG. 5 is a schematic diagram showing the paddle wheel member of the hydroelectric device raised above water to avoid an object on the river bed.
Figure 6:
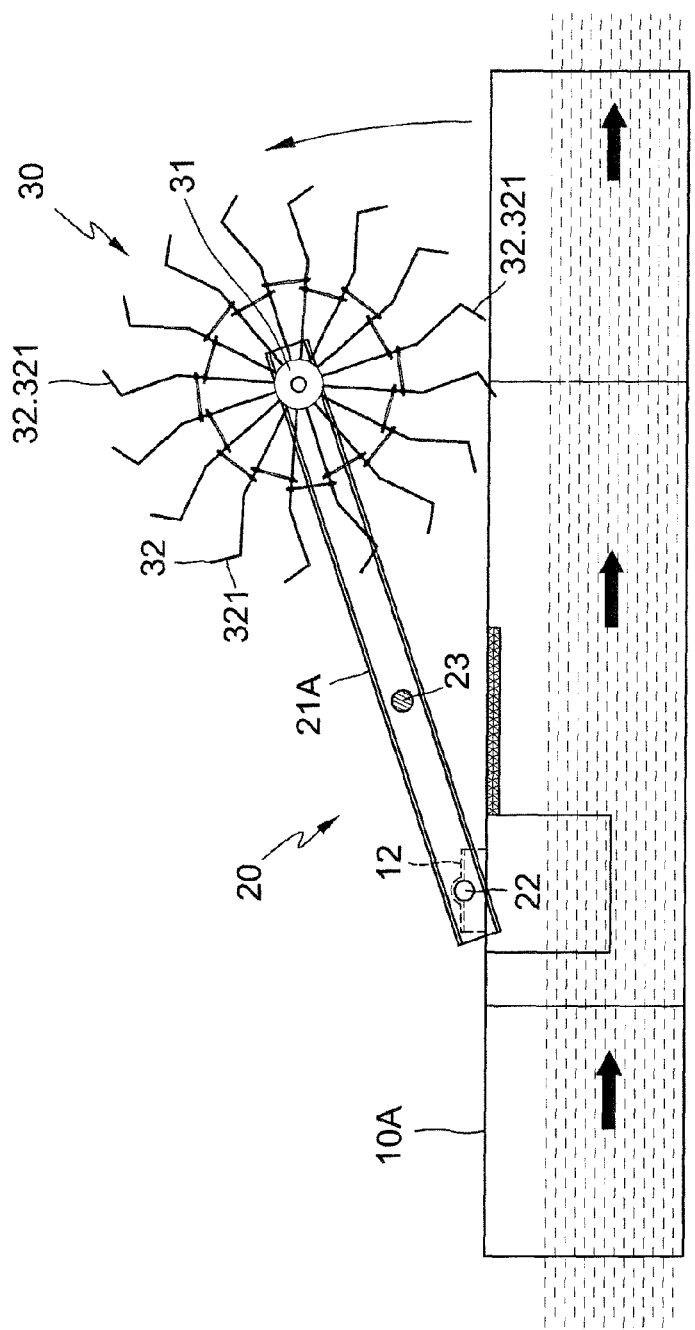
FIG. 6 is a schematic diagram showing the paddle wheel member of the hydroelectric device raised above water for maintenance.

As shown in FIG. 5, if there is an object 50 on the river bed, the water stream disturbed by the object 50 would raise the paddle wheel member 30 up with the shafts 22 as pivots through the arm elements 21A and 21B. The paddles 32 therefore avoid the object 50 and continuously spin without interruption by the object 50. The smoothness of the axle 31's spin is as such maintained and the efficiency of the power generation member 40 is enhanced. If the paddle wheel member 30 is damaged, as shown in FIG. 6, the paddle wheel member 30 can be raised above the water using the shafts 22 as pivots by lifting the arm elements 21A and 21B, or the connection rod 23. The paddle wheel member 30 then can be repaired directly without being taken down and moved ashore for repairmen. The convenience and efficiency of maintenance is therefore enhanced.

As described above, the hydroelectric device of the present invention uses water-driven paddles to engage a power generation device. The paddles can be raised above the water to avoid objects and to achieve convenient maintenance. The present invention therefore has the required novelty and non-obviousness for approval.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A hydroelectric device, comprising two base members, a hoist member, a paddle wheel member, and a power generation member; wherein
    the base members are for the installation of the hoist member, the paddle wheel member, and the power generation member; an accommodation space is formed between the base members; two pivotal elements are configured on the base members, respectively;
    the host member comprises a pair of arm elements and a connection rod; each arm element has a first end joined to one of the pivotal elements with a shaft so that the two arm elements are connected to the base members, and are able to swivel with the shafts as pivots; the connection rod is configured between and perpendicularly connected to the arm elements so that the arm elements swivel synchronously;
    the paddle wheel member comprises an axle whose two ends are pin-joined to the arm elements' second ends, respectively, a plurality of paddles radially configured around the axle, and a first transmission element configured at an end of the axle spinning synchronously along with the axle; the axle is rotatably configured across the arm elements, and across the base members, and each paddle is capable of being submerged at least partially into a water stream; the water stream pushes the paddles to turn the axle; each paddle has an outer end configured into a roughly V-shaped bended section; and
    the power generation member comprises a second transmission element at an input end engaged by the first transmission element of the axle; when the axle is turned and the first transmission element spins synchronously, the second transmission element of the power generation member is engaged to spin synchronously; and the power generation member is driven to produce electricity.

2. The hydroelectric device according to claim 1, wherein the paddle wheel member further comprises a plurality of spacing beams; each spacing beam is configured between a pair of neighboring paddles; and each spacing beam has at least an adjustment elements at an end by which the distance between the two neighboring paddles can be adjusted.

* * * * *